United States Patent
Coleman et al.

(10) Patent No.: US 9,740,408 B1
(45) Date of Patent: Aug. 22, 2017

(54) USING INFORMATION SPECIFYING AN ORGANIZATION OF A DATA STRUCTURE ASSOCIATED WITH A STORAGE DEVICE

(71) Applicant: PURE STORAGE, INC., Mountain View, CA (US)

(72) Inventors: Gordon James Coleman, Los Altos, CA (US); Eric D. Seppanen, Mountain View, CA (US); Daniel Sladic, San Jose, CA (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 15/420,904

(22) Filed: Jan. 31, 2017

Related U.S. Application Data

(60) Provisional application No. 62/403,881, filed on Oct. 4, 2016, provisional application No. 62/403,894, filed on Oct. 4, 2016, provisional application No. 62/404,095, filed on Oct. 4, 2016.

(51) Int. Cl.
*G06F 3/06* (2006.01)
*G06F 12/02* (2006.01)

(52) U.S. Cl.
CPC .............. *G06F 3/061* (2013.01); *G06F 3/065* (2013.01); *G06F 3/0652* (2013.01); *G06F 3/0655* (2013.01); *G06F 3/0688* (2013.01); *G06F 12/0246* (2013.01)

(58) Field of Classification Search
None
See application file for complete search history.

(56) References Cited

U.S. PATENT DOCUMENTS

| | | |
|---|---|---|
| 6,286,056 B1 | 9/2001 | Edgar et al. |
| 6,804,703 B1 | 10/2004 | Allen et al. |
| 6,954,881 B1 | 10/2005 | Flynn Jr. et al. |
| 7,139,907 B2 | 11/2006 | Bakke et al. |
| 7,272,674 B1 | 9/2007 | Nandi et al. |
| 7,313,636 B2 | 12/2007 | Qi |
| 7,577,802 B1 | 8/2009 | Parsons |
| 8,103,754 B1 | 1/2012 | Luong et al. |
| 8,301,811 B1 | 10/2012 | Wigmore et al. |
| 8,645,649 B2 | 2/2014 | Kaiya et al. |
| 9,063,937 B2 | 6/2015 | McDowell et al. |
| 9,294,567 B2 | 3/2016 | Hussain et al. |
| 9,430,412 B2 | 8/2016 | Huang |

(Continued)

OTHER PUBLICATIONS

Ouyang, J. et al. (Mar. 1-5, 2014) "SDF: Software-Defined Flash for Web-Scale Internet Storage Systems", ASPLOS 2014, 14 pages.

(Continued)

*Primary Examiner* — Kaushikkumar Patel
(74) *Attorney, Agent, or Firm* — Womble Carlyle Sandridge & Rice, LLP

(57) ABSTRACT

A storage device associated with a storage array may be identified. Information specifying an organization of data included in a data structure may be retrieved from the storage device. The data may be associated with characteristics of a plurality of data blocks of the storage device. A read operation or a write operation may be performed for the storage device based on the information specifying the organization of the data included in the data structure that is associated with the characteristics of the plurality of data blocks of the storage device.

26 Claims, 14 Drawing Sheets

(56) References Cited

U.S. PATENT DOCUMENTS

| | | | |
|---|---|---|---|
| 9,501,245 B2 | 11/2016 | Hussain et al. | |
| 9,565,269 B2 | 2/2017 | Malwankar et al. | |
| 2002/0016792 A1* | 2/2002 | Ito | G06F 3/0601 |
| 2007/0088716 A1* | 4/2007 | Brumme | G06F 9/45516 |
| 2008/0034167 A1 | 2/2008 | Sharma et al. | |
| 2012/0144302 A1* | 6/2012 | Campanotti | G06F 17/30038 |
| | | | 715/716 |
| 2012/0290781 A1* | 11/2012 | Seo | G06F 12/0246 |
| | | | 711/104 |
| 2013/0073821 A1* | 3/2013 | Flynn | G06F 3/061 |
| | | | 711/162 |
| 2013/0166822 A1* | 6/2013 | Franceschini | G06F 3/0601 |
| | | | 711/103 |
| 2013/0326189 A1* | 12/2013 | Cilibrasi | G06F 9/4401 |
| | | | 711/208 |
| 2014/0046900 A1* | 2/2014 | Kumarasamy | G06F 17/30575 |
| | | | 707/620 |
| 2014/0089565 A1* | 3/2014 | Lee | G06F 3/061 |
| | | | 711/103 |
| 2014/0215129 A1* | 7/2014 | Kuzmin | G06F 12/0246 |
| | | | 711/103 |
| 2014/0244897 A1* | 8/2014 | Goss | G06F 12/0246 |
| | | | 711/103 |
| 2015/0019798 A1 | 1/2015 | Huang | |
| 2016/0011782 A1* | 1/2016 | Kurotsuchi | G06F 12/16 |
| | | | 711/104 |
| 2016/0018998 A1* | 1/2016 | Mohan | G06F 3/0659 |
| | | | 711/103 |
| 2016/0188647 A1* | 6/2016 | Chang | G06F 17/30292 |
| | | | 707/805 |
| 2016/0232088 A1* | 8/2016 | Mohan | G06F 12/0246 |
| 2017/0024166 A1 | 1/2017 | Singh et al. | |
| 2017/0062023 A1* | 3/2017 | Datta | G11O 5/148 |
| 2017/0068467 A1* | 3/2017 | Rothberg | G11C 16/349 |

OTHER PUBLICATIONS

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

* cited by examiner

USING INFORMATION SPECIFYING AN ORGANIZATION OF A DATA STRUCTURE ASSOCIATED WITH A STORAGE DEVICE

RELATED APPLICATIONS

This application claims the benefit under 35 U.S.C. §119 (e) of U.S. Provisional Application 62/403,881 filed on Oct. 4, 2016, U.S. Provisional Application 62/403,894 filed on Oct. 4, 2016, and U.S. Provisional Application 62/404,095 filed on Oct. 4, 2016, which are hereby incorporated by reference.

TECHNICAL FIELD

The present disclosure is generally related to organization of data, and more particularly, to using information specifying an organization of a data structure associated with a storage device.

BACKGROUND

Data associated with a storage device may be stored within a data structure. For example, the data of the data structure may include information that corresponds to data blocks of the storage device. Such information may be associated with characteristics of the data blocks. The data structure may be used to perform operations for the storage device. For example, read operations or write operations associated with data blocks of the storage device may be performed based on the data structure that includes information that identifies the characteristics of the data blocks of the storage device.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
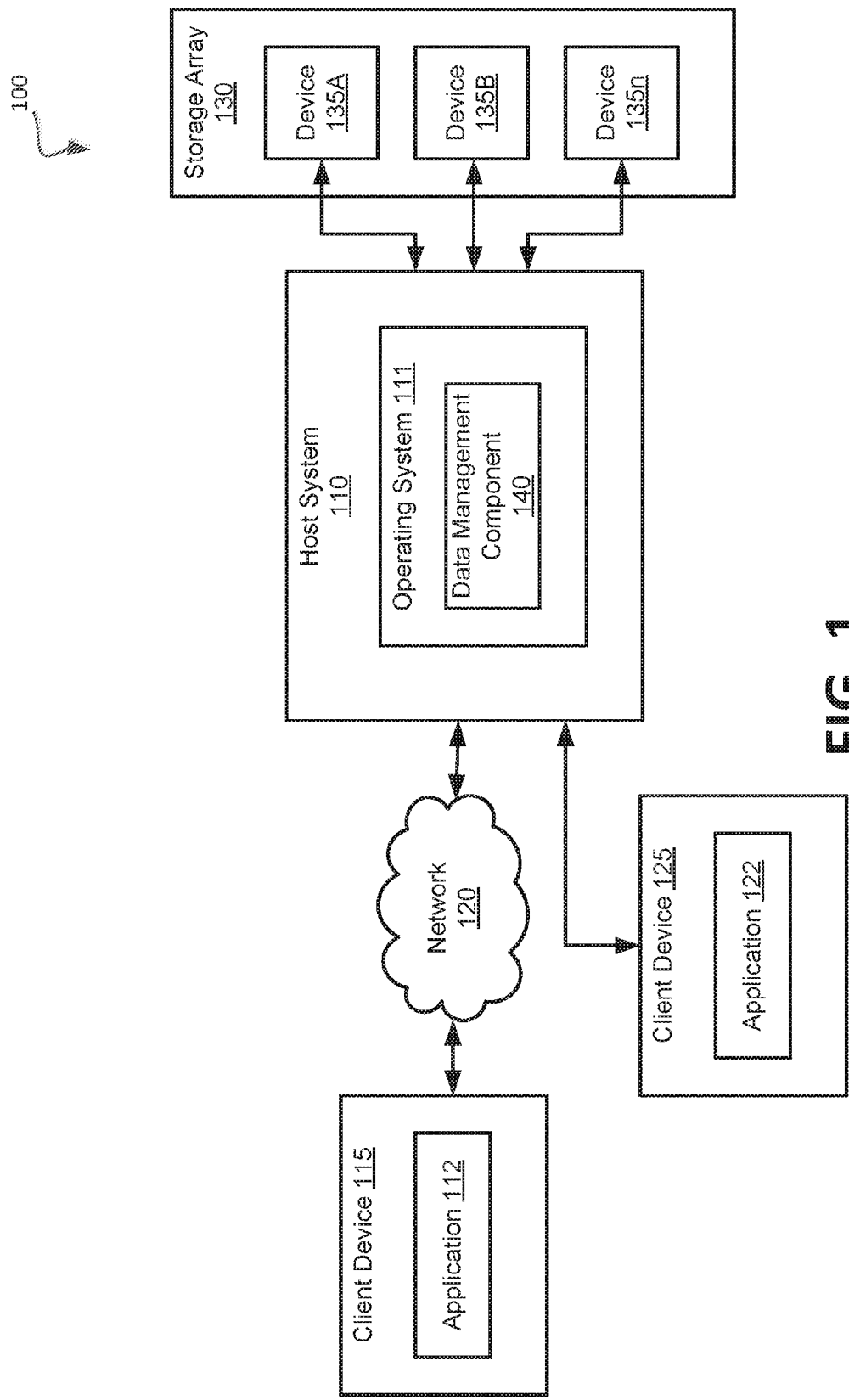
FIG. 1 illustrates an example system for data storage in accordance with some embodiments of the present disclosure.

Aspects of the present disclosure relate to using information specifying an organization of a data structure associated with a storage device. The data structure may store data relating to data blocks of the storage device that is used in a storage system. For example, the data structure may be created or generated by a firmware of the storage device (e.g., a solid-state storage device that is used in a solid-state storage array). The data in the data structure may be used by an operating system of a host system that uses the storage system that includes the storage device. For example, the operating system of the host system may use the data in the data structure that relates to the data blocks of the storage device when providing a read operation or a write operation to the storage device.

The firmware of the storage device may update the information or data in the data structure as operations are performed with the storage device. For example, the data in the data structure may be updated to reflect a number of write operations that have been performed on particular data blocks, a number of read operations that have been performed on particular data blocks, or other such characteristics of data blocks of the storage device that are changed over time. The data in the data structure may be organized as a table. For example, each data block may correspond to a row of the table. The data in a particular row of the data structure may specify characteristics of a particular data block of the storage device. For example, a row may include 100 bits and the first 20 bits of the row correspond to a first field that identifies a first characteristic (e.g., a number of write operations) of the particular data block, the next 30 bits of the row corresponds to a second field that identifies a second characteristic (e.g., a number of read operations) of the particular data block, etc. Thus, the data in the data structure may specify a series of data or bits that describe characteristics of data blocks of a storage device.

The firmware of the storage device may generate or create information that specifies which bits of a particular row of the data structure correspond to which characteristics associated with the data blocks of the storage device. For example, a directory (e.g., a second data structure) may include information that specifies an organization of the data in each row of the data structure. The directory may specify fields of each row by identifying a number of bits that correspond to each field and a location of each field in each row of the data structure (e.g., which bits of the row correspond to the respective field). Furthermore, each field may be associated with a characteristic of the respective data block. Thus, the data structure may include multiple rows with multiple bits and the directory may be used to the bits of a row that correspond to a particular field that is associated with a characteristic of a data block.

The data structure of the storage device may be changed in response to an updating or change of the firmware of the storage device. The firmware may be upgraded and may result in a changing of the organization of the data that is stored in the data structure associated with the storage device. For example, when the firmware is upgraded, the data structure that specifies characteristics of the data blocks of the storage device may include new fields for new characteristics or change the bits that are assigned to a particular field. Once the organization of the data structure has been changed, the operating system of the host system may not be able to correctly read the characteristics of the data blocks of the storage device that are specified by the data structure. For example, the operating system may not be aware that a particular set of bits of a particular row that previously corresponded to a particular characteristic of a data block has been changed to another set of bits in the same row of the data structure.

Aspects of the present disclosure address the above and other deficiencies by providing an updated directory generated by the firmware of the storage device to an operating system of a host system that uses the storage device. For example, the directory may be updated to reflect a new organization of data in the data structure when the firmware of the storage device is also updated. The operating system of the host system may retrieve the directory from the firmware of the storage device upon a power up or initialization process with the storage device. Thus, the operating system may retrieve the updated directory and be able to interpret the data in the data structure that specifies characteristics of the data blocks of the storage device. The operating system may subsequently use such data when performing read operations or write operations with the storage device.

Advantages of updating the directory and providing the updated directory to an operating system of the host system include, but are not limited to, the operating system of the host system being able to operate with storage devices with different versions of firmware. For example, the host system may retrieve different directories from different storage devices and may be able to interpret the data in different data structures that were created under different versions of the firmware. Thus, the retrieving of the directory may not necessitate an updating of the operating system to reflect the update of the firmware as instead a separate data structure or file (e.g., the directory) may be retrieved from the firmware of the storage device.

Aspects of the present disclosure may further relate to maintaining data associated with the storage device. For example, as previously described, a data structure may include data associated with characteristics of data blocks of the storage device. The data structure may be stored in the volatile memory of the storage device and may be generated by the firmware at initialization or power-up of the storage device. A second data structure may be stored in the non-volatile memory of the storage device where the second data structure also includes data associated with the characteristics of the data blocks of the storage device. A new data structure may be generated based on the data structure stored at the volatile memory and the second data structure stored at the non-volatile memory of the storage device. For example, one or more rules may be used to specify which values from the data structures are to be used for fields of the new data structure. Advantages of maintaining data associated with the storage device include, but are not limited to, protection of the data from failure of the storage device or an unexpected power failure.

Aspects of the present disclosure may further relate to scheduling operations for the storage device. For example, as previously described, the data structure that includes data associated with data blocks of the storage device may be made available to the operating system of the host system. The host system may thus receive characteristics of the data blocks of a storage device. Furthermore, the host system may be aware of the geometry of the storage device. For example, the availability of schedulable units internal to the storage device and that are to perform read or write operations may be understood by the host system and the information relating to the schedulable units and the characteristics of data blocks may be used to schedule subsequent read operations or write operations that are issued by the operating system to the storage device. Advantages of such scheduling include, but are not limited to, an increase in the performance of read operations and write operations to the storage device (e.g., a decrease in time to perform multiple read operations and/or write operations).

FIG. 1 is a block diagram illustrating a storage system 100. In general, the storage system 100 may include a host system 110 and a storage array 130, which is representative of any number of data storage arrays or storage device groups. As shown, storage array 130 includes storage devices 135A-n, which is representative of any number and type of storage devices (e.g., solid-state drives (SSDs)). Host system 110 may be coupled directly to client device 125 and the host system 110 may be coupled remotely over network 120 to client device 115. The host system 110 may be considered a storage controller for the storage array 130. Client devices 115 and 125 are representative of any number of clients which may utilize host system 110 for storing and accessing data in storage system 100. It is noted that some systems may include only a single client device, connected directly or remotely, to the host system 110.

Host system 110 may include software and/or hardware configured to provide access to storage devices 135A-n. Although host system 110 is shown as being separate from storage array 130, in some embodiments, host system 110 may be located within storage array 130. Host system 110 may include or be coupled to a base operating system (OS) 111, a volume manager, and additional control logic, such as a data structure component 140, for implementing the various techniques disclosed herein.

Host system 110 may include and/or execute on any number of processing devices and may include and/or execute on a single host computing device or be spread across multiple host computing devices, depending on the embodiment. In some embodiments, host system 110 may generally include or execute on one or more file servers and/or block servers. Storage controller 110 may use any of various techniques for replicating or maintaining data across devices 135A-n to prevent loss of data due to the failure of a device or the failure of storage locations within a device. Host system 110 may also utilize any of various data reduction technologies for reducing the amount of data stored in devices 135A-n by deduplicating common data (e.g., data deduplication, data compression, pattern removal, zero removal, or the like).

As shown in FIG. 1, the host system 110 may include a data management component 140. For example, the data management component 140 may be executed or provided by the operating system 111 of the host system 110. In some embodiments, the data management component may be provided or executed by an application. In one embodiment, the application is associated with the operating system 111. In one embodiment, the application is associated with a user space. As described in further detail below, the data management component 140 may retrieve data structures from the storage devices 135A to 135n of the storage array 130 and may use the data structures to perform operations with the storage devices 135A to 135n. For example, characteristics of data blocks of the storage devices 135A to 135n may be provided to the data management component 140 that is provided by an application or the operating system 111 of the host system 110. The data structures may be maintained and updated by the data management component 140. Furthermore, the data management component 140 may use information from the data structures to perform read operations and write operations with respect to the storage devices 135A to 135n.

In one embodiment, host system 110 may utilize logical volumes and mediums to track client data that is stored in storage array 130. A medium is defined as a logical grouping of data, and each medium has an identifier with which to identify the logical grouping of data. A volume is a single accessible storage area with a single file system, typically, though not necessarily, resident on a single partition of a storage device. The volumes may be logical organizations of data physically located on one or more of storage device 135A-n in storage array 130. Host system 110 may maintain a volume to medium mapping table to map each volume to a single medium, and this medium is referred to as the volume's anchor medium. A given request received by the host system 110 may indicate at least a volume and block address or file name, and the host system 110 may determine an anchor medium targeted by the given request from the volume to medium mapping table.

In various embodiments, multiple mapping tables may be maintained by the host system 110. These mapping tables may include a medium mapping table and a volume to medium mapping table. These tables may be utilized to record and maintain the mappings between mediums and underlying mediums and the mappings between volumes and mediums. Host system 110 may also include an address translation table with a plurality of entries, wherein each entry holds a virtual-to-physical mapping for a corresponding data component. This mapping table may be used to map logical read/write requests from each of the client devices 115 and 125 to physical locations in storage devices 135A-n. A "physical" pointer value may be read from the mappings associated with a given medium during a lookup operation corresponding to a received read/write request. The term "mappings" is defined as the one or more entries of the address translation mapping table which convert a given medium ID and block number into a physical pointer value. This physical pointer value may then be used to locate a physical location within the storage devices 135A-n. The physical pointer value may be used to access another mapping table within a given storage device of the storage devices 135A-n. Consequently, one or more levels of indirection may exist between the physical pointer value and a target storage location.

In some embodiments, storage within storage system 100 may be embodied as object storage, where data is managed as objects. Each object may include the data itself, a variable amount of metadata, and a globally unique identifier, where object storage can be implemented at multiple levels (e.g., device level, system level, interface level). In addition, storage within the storage system 100 may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

In alternative embodiments, the number and type of client devices, host systems, networks, storage arrays, and storage devices is not limited to those shown in FIG. 1. At various times one or more clients may operate offline. In addition, during operation, individual client computer connection types may change as users connect, disconnect, and reconnect to storage system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, Infiniband, NVMe-F, PCIe and any new emerging storage interconnects may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the storage devices 135A-n appear to the client devices 115 and 125 as locally attached storage.

Client devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

In one embodiment, client device 115 includes application 112 and client device 125 includes application 122. Applications 112 and 122 may be any computer application programs designed to utilize the data from the storage devices 135A to 135n. Applications 112 and 122 may issue requests to read data from or write data to storage devices within storage system 100. For example, as noted above, the request may be to read data or write data.

Figure 2:
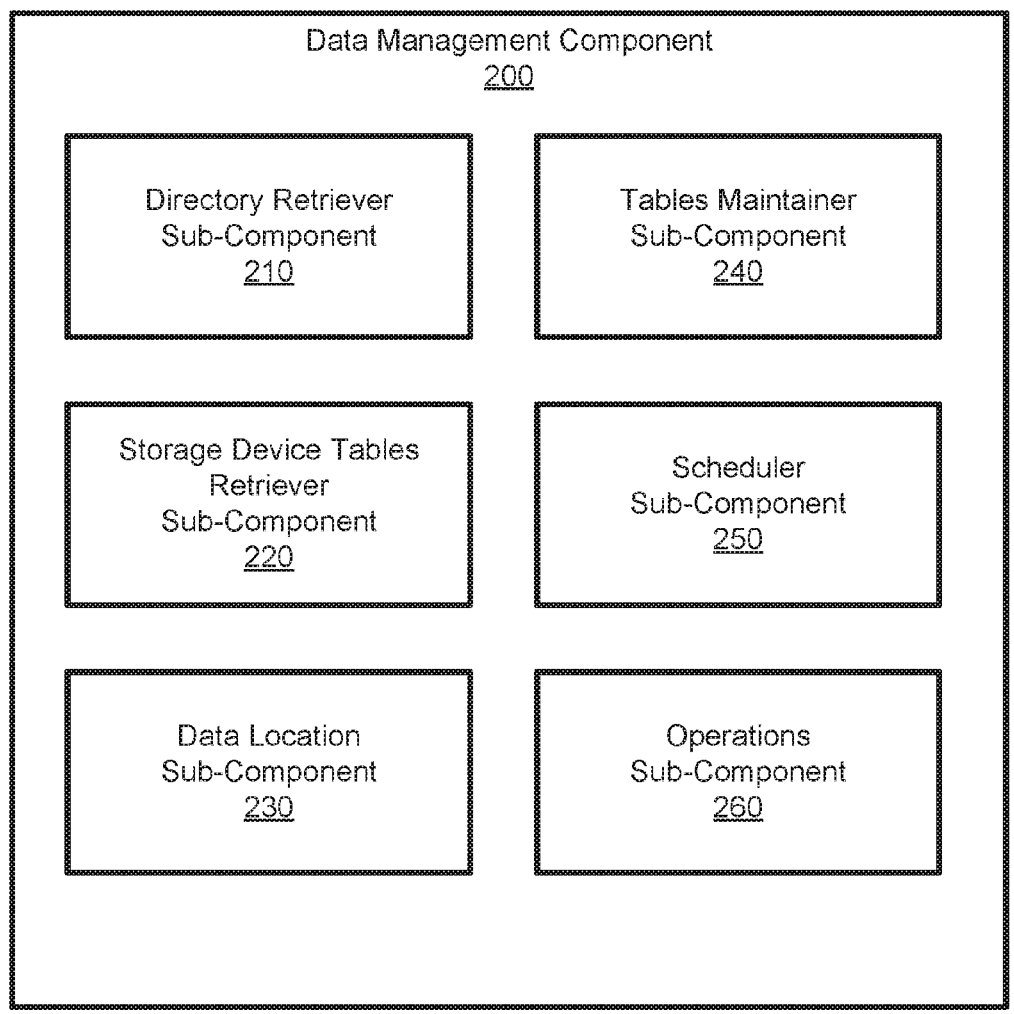
FIG. 2 illustrates an example data management component in accordance with some embodiments.

FIG. 2 illustrates an example data management component 200. In general, the data management component 200 may correspond to the data management component 140 of FIG. 1. The data management component 200 may include a directory retriever sub-component 210, a storage device tables retriever sub-component 220, a data location sub-component 230, a tables maintainer sub-component 240, a scheduler sub-component 250, and an operations sub-component 260. In alternative implementations, the functionality of one or more of the sub-components may be combined or divided.

As shown in FIG. 2, the data management component 200 may include a directory retriever sub-component 210 and a storage device tables retriever sub-component 220. For example, a first data structure (e.g., the directory) and a second data structure (e.g., one or more tables) may be retrieved from a storage device of a storage array. The data location sub-component 230 may use the directory to identify locations of data associated with characteristics of data blocks of the storage device within the retrieved tables. Further details with regard to the directory, one or more tables, and an organization of information in the tables are described in conjunction with FIGS. 3-6.

The data management component 200 may further include a tables maintainer sub-component 240. For example, the tables maintainer sub-component 240 may be used to maintain or update one or more data structures (e.g., one or more tables) of the storage device. Further details with regards to maintaining a data structure associated with the storage device are described in conjunction with FIGS. 7-9. The data management component 200 may further include a scheduler sub-component 250 that may schedule one or more operations for the storage device. For example, write operations and read operations may be scheduled based on retrieved data structures and a topology of the storage device as described in conjunction with regards to FIGS. 10-13.

Referring to FIG. 2, the data management component 200 may further include an operations sub-component 260 that may perform a read operation or a write operation at the storage device. For example, the read operation or the write operation may be provided by an operating system or an application that includes the data management component 200.

Figure 3:
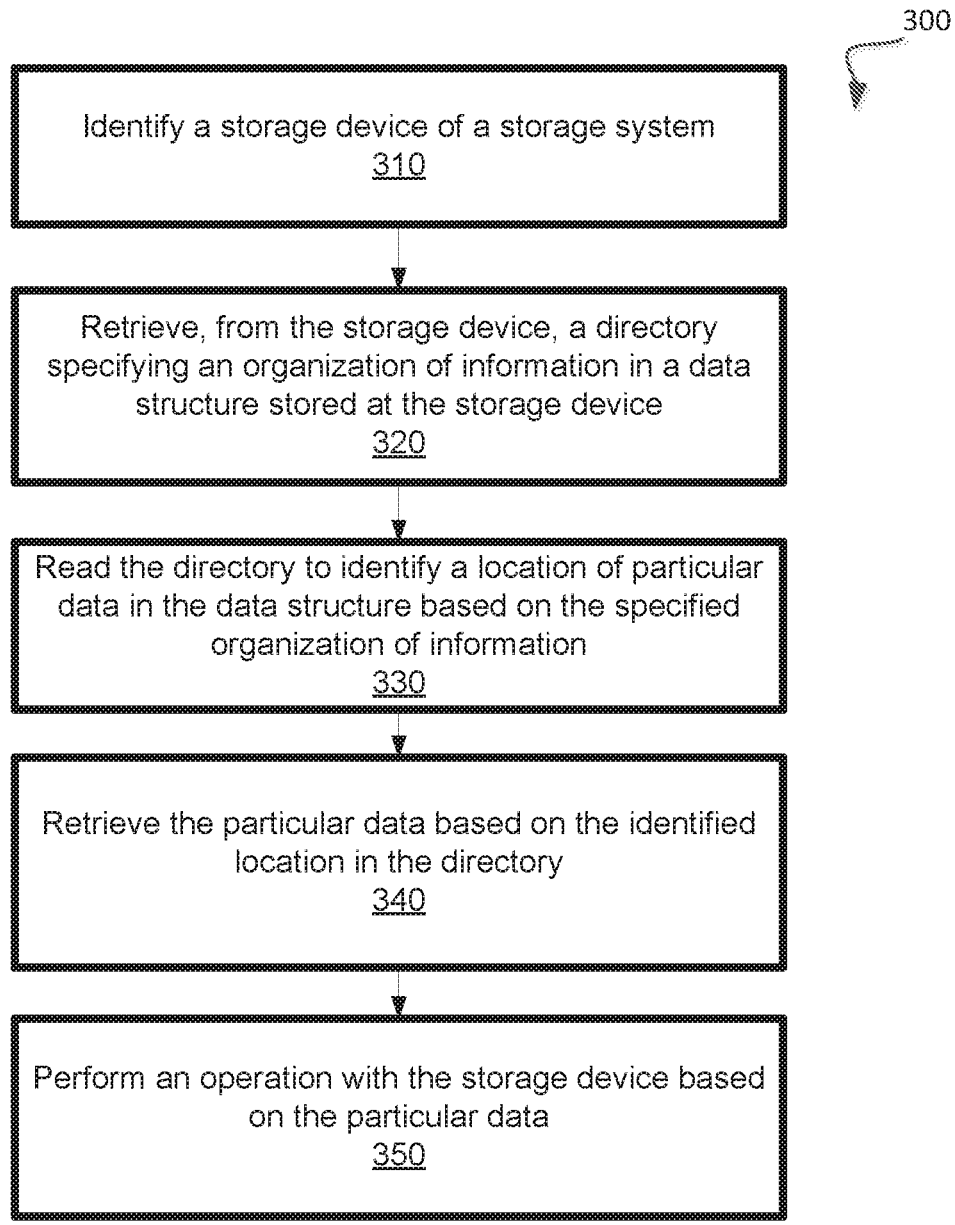
FIG. 3 is an example method to perform an operation with a storage device based on a directory of a data structure in accordance with some embodiments of the present disclosure.

FIG. 3 is an example method to perform an operation with a storage device based on a directory of a data structure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 300.

As shown in FIG. 3, the method 300 may begin with the processing logic identifying a storage device of a storage system (block 310). For example, the storage device may be a solid-state storage device (e.g., a flash-based storage device) that is part of a storage array that includes a host system that is running an operating system. The processing logic may further retrieve, from the storage device, a directory that specifies an organization of information in a data structure stored at the storage device (block 320). The directory may be another data structure that is generated or created by the firmware of the storage device that is operated from a storage controller of the storage device. In some embodiments, the directory may be stored in a buffer memory or a volatile memory of the storage controller of the storage device. Thus, the directory may be retrieved by the operating system of the host system from the storage controller. In some embodiments, the directory may be retrieved when the operating system starts up or is initialized with the storage device (e.g., the directory is retrieved before the operating system performs a read or write operation for the storage device). Furthermore, the directory may specify a format or an organization of data stored in a data structure that is stored at the storage device. The data structure may be stored in a non-volatile memory of the storage device.

The data structure may include data corresponding to characteristics of data blocks of the storage device. Examples of such data include, but are not limited to, a number of read operations that have been performed for a particular data block, a number of write operations that have been performed for the particular data block, a time that data was written to for he particular data block, or any other characteristic associated with a state of a data block. In some embodiments, one of the data structures may specify characteristics of the storage device such as, but not limited to, a number of power cycles of the storage device, how long the storage device has been in operation, a total number of read operations or write operations performed with the storage device, etc.

Referring to FIG. 3, the processing logic may read the directory to identify a location of particular data in the data structure based on the specified organization of information (block 330). For example, the operating system of the host system may use the directory to understand or interpret the data structure stored at the storage controller of the storage device. In some embodiments, the operating system may retrieve the data structure at the storage controller. In the same or alternative embodiments, the storage controller may store multiple data structures. Thus, where a single data structure is described herein, multiple data structures may also be used. The data structures may be a table with multiple rows and where each of the rows corresponds to a different data block of the storage device. The data in a particular row may correspond to various characteristics of the respective data block corresponding to the particular row. Further details with regard to the data structure are described in conjunction with FIG. 5.

The processing logic may further retrieve the particular data based on the identified location in the directory (block 340). For example, the directory may specify a format or organization of data in each row of the data structure. The format or organization may specify fields (i.e., data fields) of the row where each field is associated with a name (e.g., a type of data), a number of bits of the row that are included in the field (e.g., the size of the field), and an offset for the field (e.g., a difference between the start of the row or the first bit of the row and the start of the data field or the first bit of the data field within the row). As an example, the particular data may relate to a number of write operations that have been performed with a particular data block of the storage device. In some embodiments, the operating system of the host system may retrieve a particular type of data from multiple rows of the data structure. For example, the number of write operations from each data block may be identified by using the directory to identify the bits of each row of the data structure that specifies the number of write operations for the respective data block. Subsequently, the processing logic may perform an operation with the storage device based on the particular data (block 350). For example, a read operation or a write operation may be issued by the operating system for the storage device based on the particular data from the data structure that has been identified by using the directory that has been retrieved from the storage device.

Figure 4:
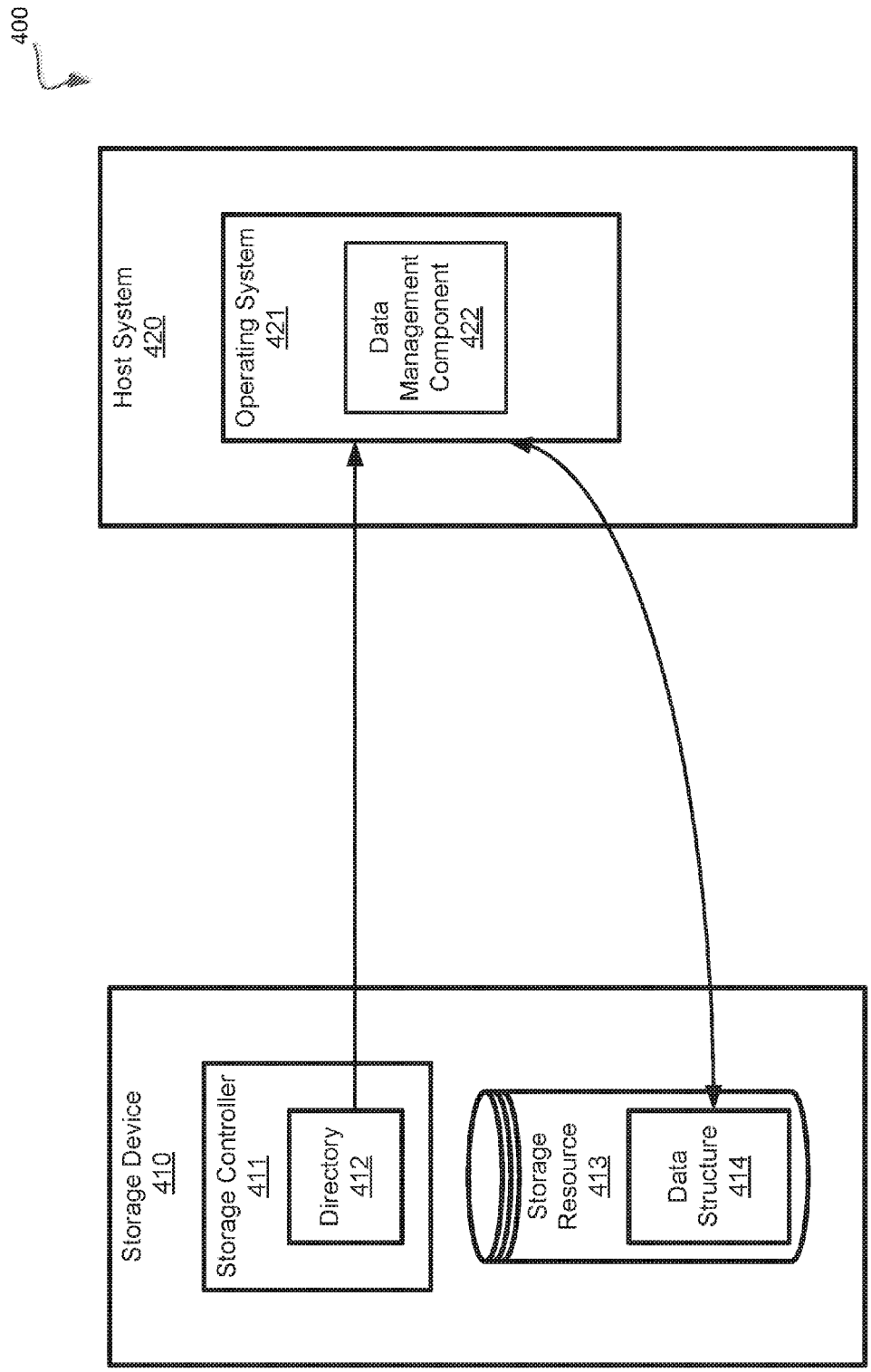
FIG. 4 is an example environment of a storage device with a host system using a directory specifying an organization of a data structure associated with the storage device in accordance with some embodiments.

FIG. 4 is an example environment 400 of a storage device with a host system using a directory specifying an organization of a data structure associated with the storage device. In general, the environment 400 may include an operating system that includes a data management component 422 that may correspond to the data management component 140 or data management component 200 of FIG. 1 or 2.

As shown in FIG. 4, the storage device 410 may include a storage controller 411 that operates a firmware of the storage device 410. A buffer memory, or a volatile memory, of the storage controller may store the directory 412. As previously described, the directory 412 may specify data associated with characteristics of data blocks of the storage resource 413 of the storage device 410. In some embodiments, the directory 412 may be generated by the firmware of the storage controller 411 in response to a power up or initialization of the storage device 410. The storage resource 413 may correspond to non-volatile memory (e.g., flash memory) of the storage device 410 and may include the data structure 414 (or multiple data structures) that includes the characteristics of the data blocks.

The host system 420 may include an operating system 421 that may retrieve the directory 412 from the storage controller 411 and may use the directory 412 to understand a current format or organization of the data structure 414 that has been used by the current version of the firmware of the storage controller 411. For example, the data management component 422 of the operating system 421 may retrieve the directory 412 and the data structure 414. In some embodiments, the data management component 422 may be provided by an application within the operating system 421.

In operation, the host system 420 may retrieve the directory 412 when first connecting or coupling with the storage device 410 and before the host system 420 issues a write operation or a read operation for data at data blocks of the storage device 410. The directory 412 may specify a first organization of data stored within rows of the data structure 414 (e.g., a table). If the host system 420 connects with another storage device (not shown), then the host system 420 may also retrieve the directory of the other storage device where the other directory may specify a second organization of data stored within rows of the data structure of the other storage device. Thus, the host system 420 may retrieve different directories from different storage devices to understand the organization of data stored at rows of different data structures of different storage devices.

Figure 5:
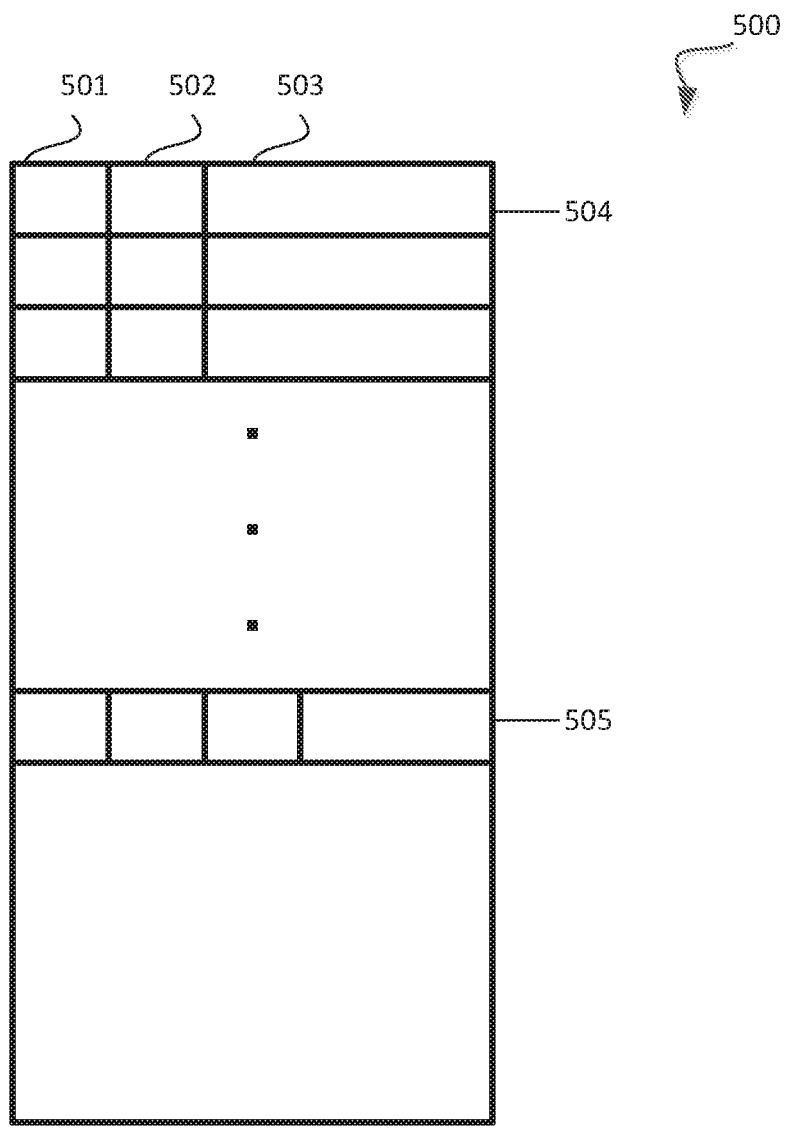
FIG. 5 illustrates an example data structure with fields specified by a directory in accordance with some embodiments.

FIG. 5 illustrates an example data structure 500 with fields specified by a directory. In general, the data structure 500 may correspond to the data structure 414 of FIG. 4 or a data structure associated with a data management component 140 or data management component 200 of FIG. 1 or 2.

As shown in FIG. 5, the data structure 500 may include multiple rows. For example, a row 504 may correspond to a data block of a storage device. The row 504 may include multiple bits and an organization of the bits of the row 504 may be specified by a directory. For example, the directory may specify a first field 501, second field 502, and a third field 503 of the row 504 where each of the first field 501, second field 502, and third field 503 specifies different characteristics of the data block corresponding to the row 504. The first field, second field, and third fields 501, 502, and 503 may each be referred to as a data field. The directory may specify the name, location (e.g., offset from the start of the start of the row to the start of the field), and a length (e.g., a number of bits of the row) of the field. In some embodiments, the directory may specify, for each row, the various fields in the row where different rows may include a different organization of data and thus different fields. For example, as shown, the row 505 may include a different organization of data. For example, as shown, the row 505 may include a larger number of fields than the row 504. Thus, a directory may specify different fields for different rows of a table. The different data fields may be specified by different lengths and different offsets from the start of the row.

Figure 6:
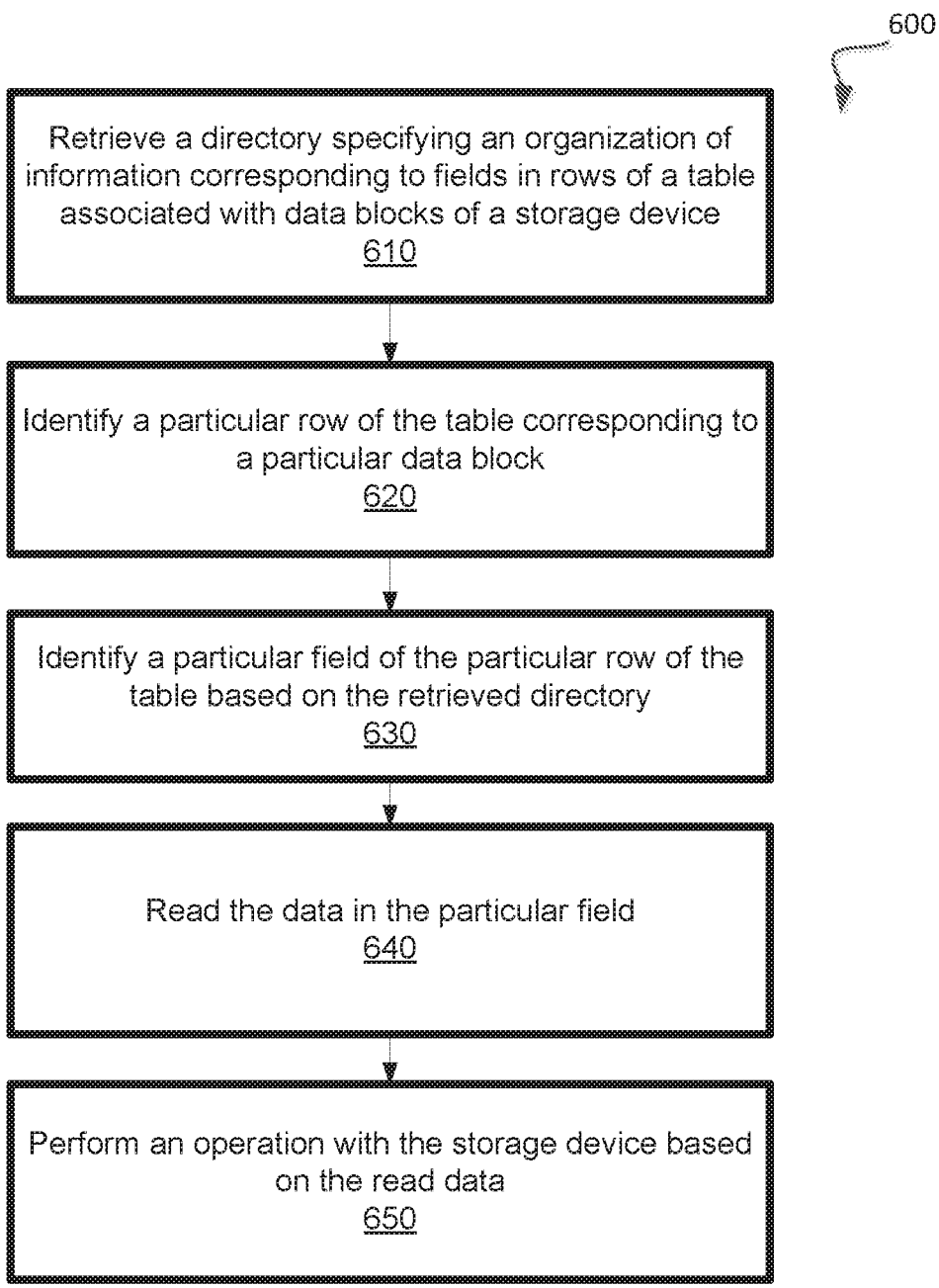
FIG. 6 is an example method to perform an operation with a storage device based on a field of the data structure that is identified based on a directory in accordance with some embodiments of the present disclosure.

FIG. 6 is an example method 600 to perform an operation with a storage device based on a field of the data structure that is identified based on a directory. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 600.

As shown in FIG. 6, the method 600 may begin with the processing logic retrieving a directory specifying an organization of information corresponding to fields in rows of a table associated with data blocks of a storage device (block 610). For example, the directory may be retrieved from the storage controller of the storage device or may have been previously retrieved from the storage controller and is stored at a host system. The processing logic may further identify a particular row of the table corresponding to a particular data block (block 620). For example, one row of multiple rows of a table that is assigned to the particular data block may be identified. The row may be identified by using a directory that specifies the organization of information in the table. The processing logic may further identify a particular field of the particular row of the table based on the retrieved directory (block 630). For example, the operating system of the host system may seek a field with a particular name (e.g., number of write operations) and may use the directory to identify bits of the particular row that are assigned to the particular field. The processing logic may subsequently read the data in the particular field (block 640). For example, the operating system of the host system may request the particular row from the storage controller of the storage device and may identify the particular field from the received row. In some embodiments, the operating system may receive the entire table and may then identify the particular field from the received table. The processing logic may subsequently perform an operation with the storage device based on the read data (block 650). For example, the operating system of the host system may perform a read operation or a write operation based on the read data.

In some embodiments, the operating system may select a table (e.g., data structure) from multiple tables stored at the storage controller of the storage device by using the directory. For example, the directory may specify a category or name that is assigned to each table the operating system may select one of the tables by using the directory. Subsequently, the operating system may use the directory to interpret the fields of each row of the table as previously described. In some embodiments, the directory may be stored at a defined location at the storage controller or other such memory location at the storage controller and the operating system may retrieve the directory at the defined location when the host system first connects with the storage device.

In some embodiments, a directory and one or more tables may be retrieved from multiple storage devices of a storage array. The storage devices of the storage array may each include different directories that specify different fields for the respective tables or data structures. For example, a first storage device may be operating by a first firmware of a first version and a second storage device may be operated by a second firmware of a different second version. A first directory of the first storage device may specify different bits of a table as being associated to a particular field associated with a characteristic of a data block than a second directory of the second storage device.

As previously described aspects of the present disclosure may further relate to maintaining data associated with the storage device. For example, the data structures may correspond to one or more tables. The data structures may be stored in a volatile memory of the storage controller of the storage device. However, if the storage device loses access to power and is turned off, then the data structures in the volatile memory may be deleted or removed. When the storage device regains access to power and is turned back on, the data structures in the volatile memory may again be generated based on data stored at data blocks of the storage device. For example, characteristics of the data blocks may be stored with data at the respective data block and the data structures may be generated based on the characteristics stored alongside with the data at the data blocks of the storage device. However, for certain types of characteristics, the data stored at the data blocks may not be accurate. For example, if the data block was erased, then characteristics of the data block that were stored at the data block may also be erased. As a result, the data structure stored at the volatile memory of the storage controller may not include the most recent or accurate characteristics of the data blocks of the storage device.

An operating system of a host system that uses the storage device may retrieve a portion of or all of the data structures stored at the volatile memory and may write the retrieved data structures to the non-volatile memory of the storage device that is not deleted or lost should the storage device become powered down. However, since the data structures may be frequently updated, the operating system may not store the updated data structures at the non-volatile memory of the storage device at each update. Instead, the operating system may locally update the data structures and then periodically store the updated data structures at the non-volatile memory of the storage device. As a result, the volatile memory of the storage device may store a first set of data structures (e.g., a first set of tables) and the non-volatile memory of the storage device may store a second set of data structures (e.g., a second set of tables) where the different sets of data structures may store a different value for a particular characteristic of a particular data block. For example, a row of the first set of data structures for a data block may specify a first value for a characteristic of the data block and a corresponding row of the second set of data structures for the data block may specify a second value for the characteristic of the data block.

In order to resolve such a discrepancy, one or more rules may be used to create a new data structure with values selected from a combination of the first set of data structures and the second set of data structures. The new data structure may then be used by the operating system of the storage device to perform read operations or write operations with the storage device.

Figure 7:
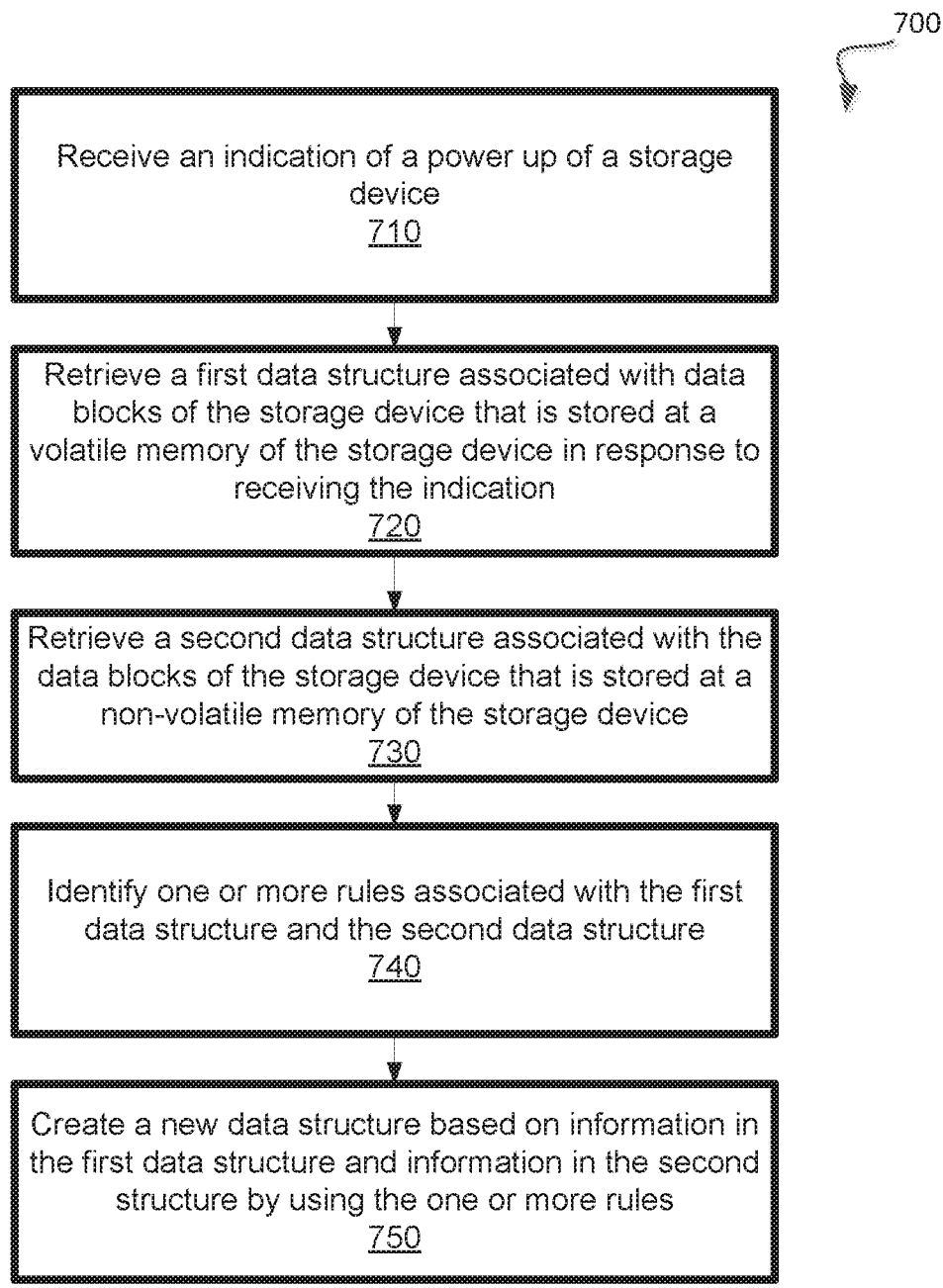
FIG. 7 is an example method to create a new data structure based on at least one rule and a first data structure and a second data structure in accordance with some embodiments of the present disclosure.

FIG. 7 is an example method 700 to create a new data structure based on at least one rule and a first data structure and a second data structure. In general, the method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 700.

As shown in FIG. 7, the method 700 may begin with the processing logic receiving an indication of a power up of a storage device (block 710). The processing logic may further retrieve a first data structure associated with data blocks of the storage device that is stored at a volatile memory of the storage device in response to receiving the indication of the power up of the storage device (block 720). For example, an operating system of a host system may retrieve the first data structure (or a first set of data structures) from a volatile memory of a storage controller of the storage device. The first data structure may be generated at power-up of the storage device. For example, the first data structure may be generated based on data stored at data blocks of the storage device. Furthermore, the processing logic may retrieve a second data structure associated with the data blocks of the storage device that is stored at a non-volatile memory of the storage device (block 730). For example, the operating system may retrieve the second data structure (or a second set of data structures) form a non-volatile memory of the storage device.

The processing logic may subsequently identify one or more rules associated with the first data structure and the second data structure (block 740). The one or more rules may specify when a value for a particular field (e.g., an entry) in a row for the new data structure should be selected from the first data structure or the second data structure. For example, a rule may specify that a larger value for the field from the first data structure or the second data structure should be selected for the corresponding field in the new data structure. In some embodiments, the rule may specify that the larger value should be selected when the field corresponds to a number of read operations or a number of write operations that have been performed with the respective data block. In the same or alternative embodiments, the rule may specify that a more recent value should be selected between the values from the first data structure and the second data structure. The one or more rules may specify that if the field (i.e., an entry) of the new data structure is assigned to a number of read operations for the respective data block, then the value from the information of the second data structure may be selected instead of the value from the information of the first data structure. Similarly, the one or more rules may further specify that if the field or entry of the new data structure is assigned to a number of erase counts for the respective data block, then the value from the information of the second data structure may be selected instead of the value from the information of the first data structure. Thus, the one or more rules may specify to select a value for a new entry in the new data structure based on values of the first and second data structures and/or based on the characteristic of the data block that is represented by the value.

Referring to FIG. 7, the processing logic may further create a new data structure based on information in the first data structure and information in the second structure by using the one or more rules (block 750). For example, the one or more rules may be used to specify when, for a particular field or entry in a particular row of the new data structure, to provide a value from the first data structure or the second data structure. The new data structure may be stored at the non-volatile memory of the storage device.

Figure 8:
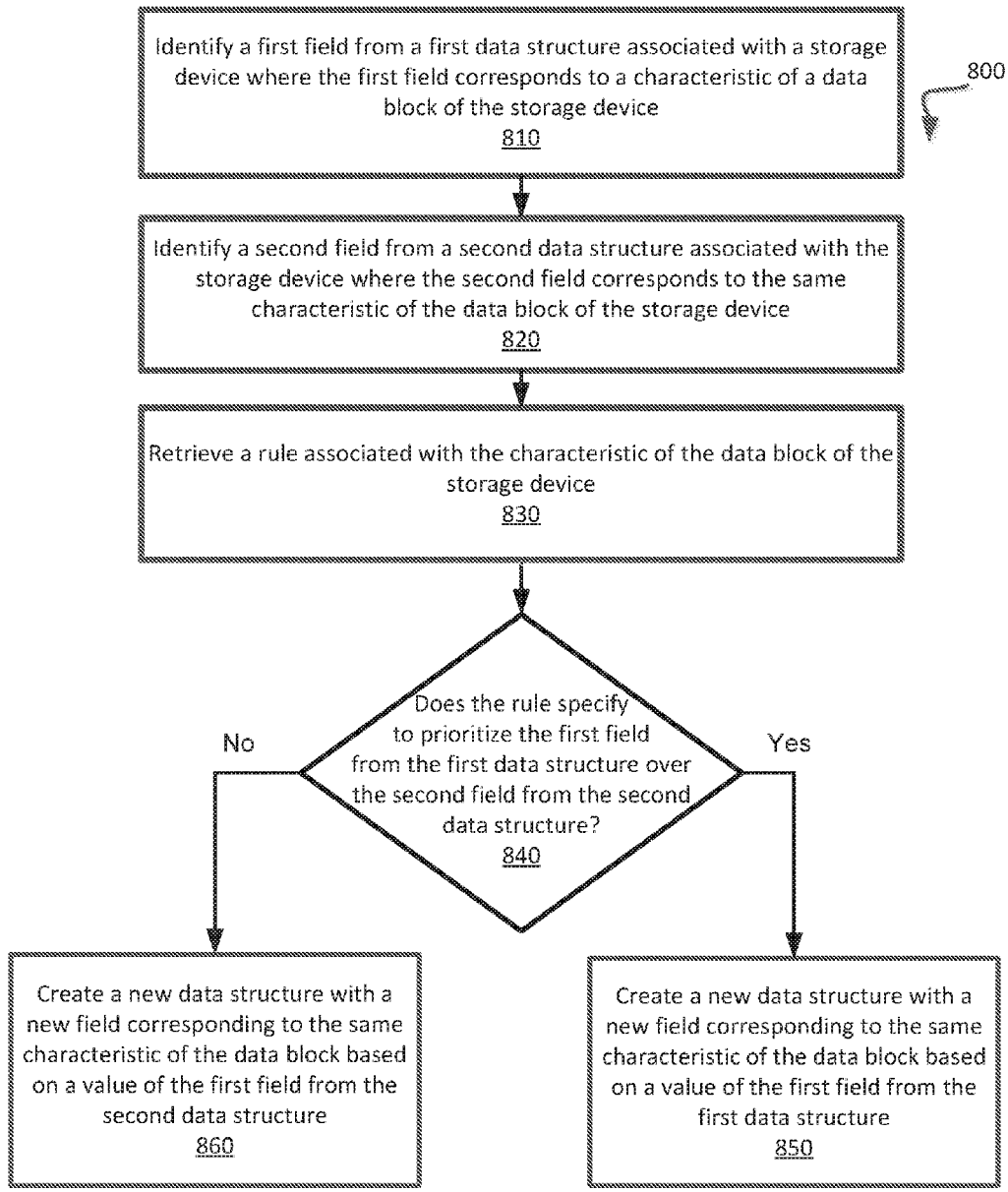
FIG. 8 is an example method to create a new data structure with a new field based on a rule in accordance with some embodiments of the present disclosure.

FIG. 8 is an example method 800 to create a new data structure with a new field based on a rule. In general, the method 800 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 800.

As shown in FIG. 8, the method 800 may begin with the processing logic identifying a first field from a first data structure associated with a storage device where the first field corresponds to a characteristic of a data block of the storage device (block 810). For example, the first field (also referred to as an entry) may be a field of a row of a table that is assigned to the data block as previously described. The processing logic may also identify a second field from a second data structure associated with the storage device where the second field corresponds to the same characteristic of the data block of the storage device (block 820). The first field and the second field may thus be assigned to the same characteristic of the same data block of the same storage device. The processing logic may further retrieve a rule associated with the characteristic of the data block of the storage device (block 830). For example, the rule may be assigned to the characteristic of the data block. The rule may specify a value that is to be selected (i.e., prioritized) between the first data structure and the second data structure for the type of characteristic corresponding to the first field and the second field. The processing logic may subsequently determine whether the rule specifies to prioritize the first field from the first data structure over the second field from the second data structure (block 840). If the rule specifies to prioritize the first field from the first data structure over the second field from the second data structure, then the processing logic may create a new data structure with a new field corresponding to the same characteristic of the data block based on a value of the first field from the first data structure (block 850). For example, the new field of a row that is assigned to the same data block in the new data structure may be assigned a value from the first field of the same row representing the same data block from the first data structure. Otherwise, if the rule does not specify to prioritize the first field from the first data structure over the second field from the second data structure, then the processing logic may create a new data structure with a new field corresponding to the same characteristic of the data block based on a value of the first field from the second data structure (block 860).

Thus, a rule may be assigned to a type of characteristic of a data block that corresponds to the new entry of the new data structure. As an example, a first rule may specify that if the characteristic is a number of read operations of the data block, then the value from the second data structure should be prioritized over the value from the first data structure. A second rule may specify that if the characteristic is a number of write operations of the data block, then the value from the first data structure should be prioritized over the value from the second data structure.

Figure 9:
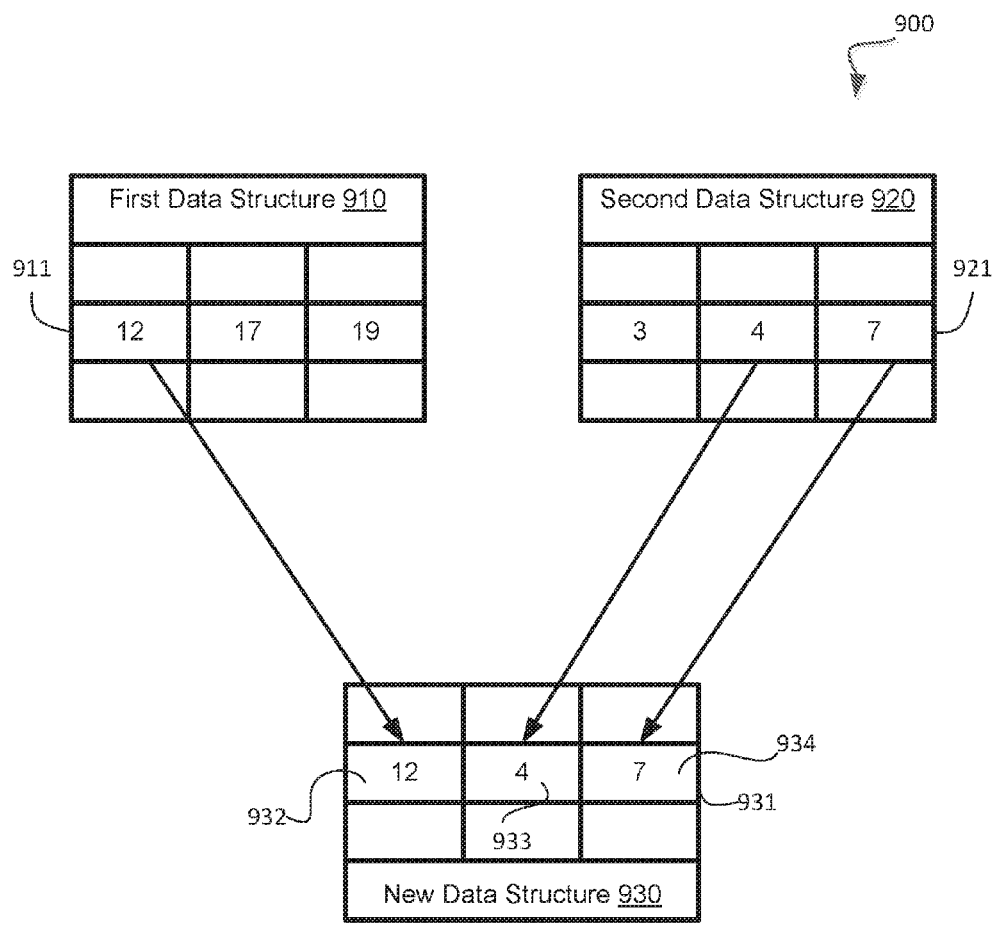
FIG. 9 is an example environment to select a value between a field of a first data structure and a corresponding field of a second data structure in accordance with some embodiments.

FIG. 9 is an example environment 900 to select a value between a field of a first data structure and a corresponding field of a second data structure. In general, the environment 900 may include a new data structure with values selected from a combination of the first data structure and the second data structure. The new data structure may be generated by the data management component 140 or data management component 200 of FIG. 1 or 2.

As shown in FIG. 9, a first data structure 910 and a second data structure 920 may be used to create a new data structure 930. For example, the data structures 910, 920, and 930 may be tables with rows where each row includes multiple fields or entries. Each of the fields or entries may correspond to a different characteristic or state of the data block that is represented by the row. The fields or entries of the row 931 of the new data structure 930 may be populated with values from the row 911 of the first data structure 910 and values from the row 921 of the second data structure 921. For example, the field 932 may correspond to a first characteristic of the data block that is represented by the row 911, row 921, and row 931. A first rule may specify that the value from the first data structure 910 is to be prioritized over the value from the second data structure 920. Thus, the field 932 in the row 931 of the new data structure 930 may be provided the value from the first field of the row 911 of the first data structure 910. The field 933 may correspond to a second characteristic of the data block and a second rule may specify that the value from the second data structure 920 is to be prioritized over the value from the first data structure 910. Thus, the field 933 in the new data structure 930 may be provided the value from the second field of the row 921 of the second data structure 920. Furthermore, the field 934 may correspond to a third characteristic and a third rule may specify that the value form the second data structure 920 is to be selected to be provided to the third field 934.

In some embodiments, after the new data structure 930 has been created based on values from fields of the first and second data structures 910 and 920 being selected by various rules, the new data structure (e.g., the new plurality of tables) may be stored at the non-volatile memory of the storage device. Furthermore, as subsequent read operations and write operations are performed, the new data structure that is stored at the non-volatile memory may be updated by the operating system of the host system that includes the storage device.

As previously described, aspects of the present disclosure may further relate to scheduling operations for the storage device. The operating system of the host system may schedule read operations or write operations to data blocks of the storage device. For example, the topology of the storage device and characteristics of the data blocks of the storage device may be known to the operating system by using the data structure that is retrieved from the storage device as previously described. The topology of the storage device may be the arrangement of storage packages (e.g., flash memory packages) and an arrangement of schedulable units (e.g., storage dies or flash memory dies) within each of the storage packages. As a result, the topology of schedulable units and the characteristics of the data blocks within the schedulable units may be known to the operating system of a host system that uses the storage device. In some embodiments, the scheduling of such operations with the schedulable units may be performed by an application that is executed within or by the operating system.

The schedulable units may each be capable of performing a read operation or a write operation at the same time. For example, each of the schedulable units may be capable of performing any combination of a read operation or a write operation in parallel with the other schedulable units. Thus, a schedulable unit is a storage die of a storage package of the storage device that may independently perform a read operation or a write operation in parallel with other schedulable units of the same storage device Since the operating system (or an application) issues read operations and write operations to be performed by the various schedulable units of the storage device, the operating system may be aware of the ordering of such read and write operations and when such read and write operations are to be performed by each of the schedulable units.

For example, as previously described, the data structure that includes data associated with characteristics of the data blocks of the storage device may be made available to the operating system (or application) of the host system. The host system may thus receive characteristics of the data blocks of a storage device. Furthermore, the host system may be aware of the topology of the storage device. For example, the availability of schedulable units internal to the storage device and that are to perform read or write operations may be understood by the operating system of the host system and the information relating to the schedulable units and the characteristics of data blocks may be used by the operating system to schedule subsequent read operations or write operations that are issued by the operating system or application to the storage device. Advantages of such scheduling include, but are not limited to, an increase in the performance of read operations and write operations to the storage device (e.g., a decrease in time to perform multiple read operations and/or write operations).

Figure 10:
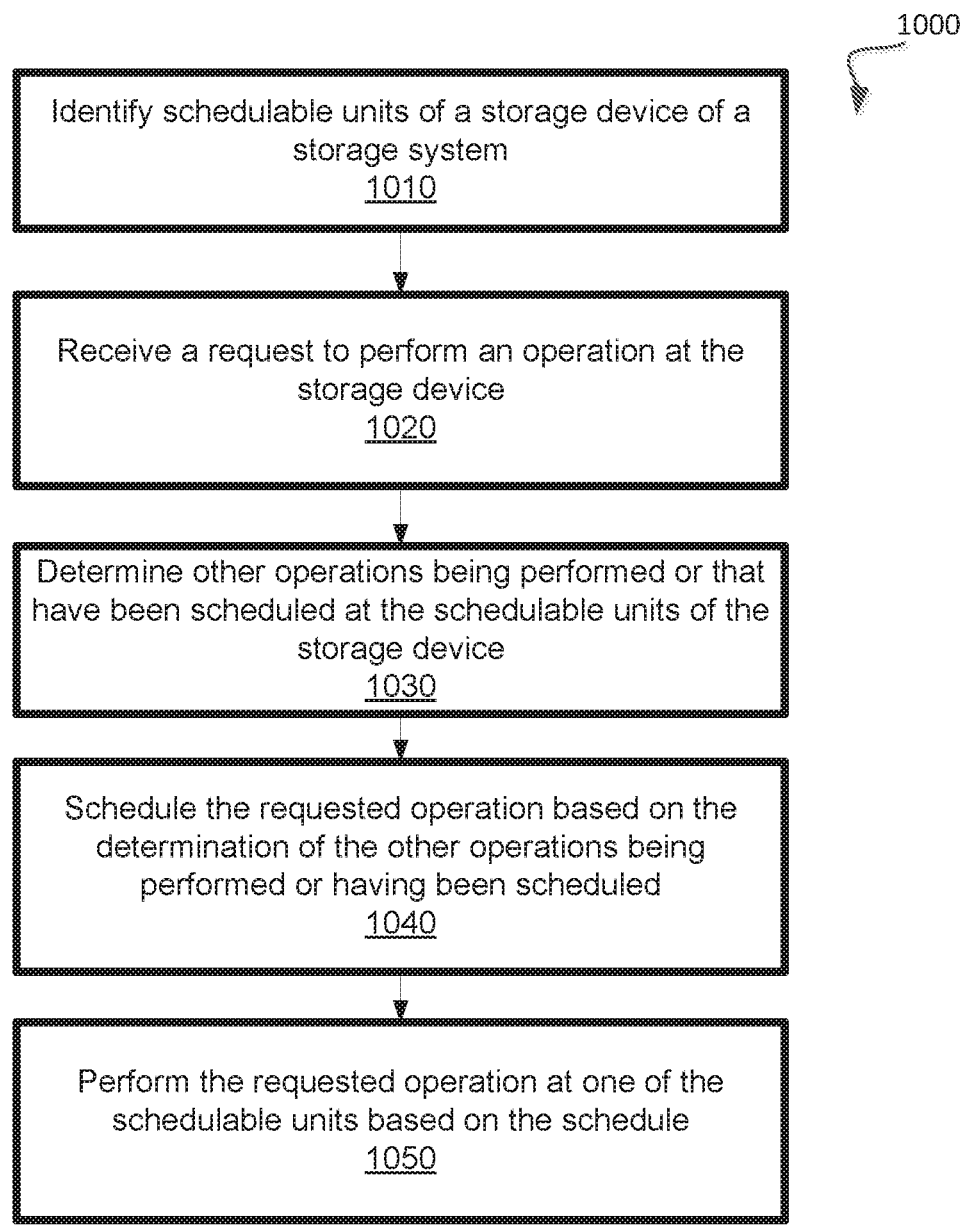
FIG. 10 is an example method to perform a requested operation based on other operations of schedulable units of a storage device in accordance with some embodiments of the present disclosure.

FIG. 10 is an example method 1000 to perform a requested operation based on other operations of schedulable units of a storage device. In general, the method 1000 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 1000.

As shown in FIG. 10, the method 1000 may begin with the processing logic identifying schedulable units of a storage device of a storage system (block 1010). For example, an operating system or an application of the operating system may receive information identifying the topology of the schedulable units of the storage device. In some embodiments, the information may be identified from a data structure (e.g., one or more tables) associated with characteristics of data blocks of the storage device as previously described. The operating system may be executed by a host system that is associated with a storage array that includes the storage device. The processing logic may further receive a request to perform an operation at the storage device (block 1020). For example, the operating system or the application may receive a request from a client system (e.g., a user) or a system task (e.g., another software entity or component) to perform a read operation or a write operation at the storage device. The processing logic may subsequently determine other access operations that are being performed or have been scheduled at the schedulable units of the storage device (block 1030). For example, other read operations and write operations that have been received by the operating system or the application from a client system or system task may be identified. In some embodiments, the other access operations that are being performed or that have been scheduled at the schedulable units may be associated with a garbage collection process. In general, the garbage collection process may remove or delete data stored at a set of data blocks so that data at a first portion of the set of data blocks is deleted or removed and copied to a second portion of the set of data blocks. As a result, the garbage collection process may read data and write data at different data blocks of different schedulable units of a storage device.

Furthermore, the processing logic may schedule the requested operation based on the determination of the other access operations that are being performed or having been scheduled to be performed (block 1040). For example, the requested operation may be a write operation to store data at a data block of the storage device. A data block of the storage device may be selected to store the data based on a schedulable unit of the storage device that is available. For example, the write operation may be performed by a schedulable unit that includes the selected data block when the schedulable unit is currently available to perform the write operation at the data block (e.g., the schedulable unit is not currently performing another access operation or will be performing another access operation before the requested operation can be performed). In some embodiments, the requested operation may further be performed based on characteristics of data blocks (e.g., from the data structure) of the storage device and/or characteristics associated with an entity that has requested the operation as further described in conjunction with FIG. 12. The processing logic may further perform the requested operation at one of the schedulable units based on the schedule (block 1050).

Figure 11:
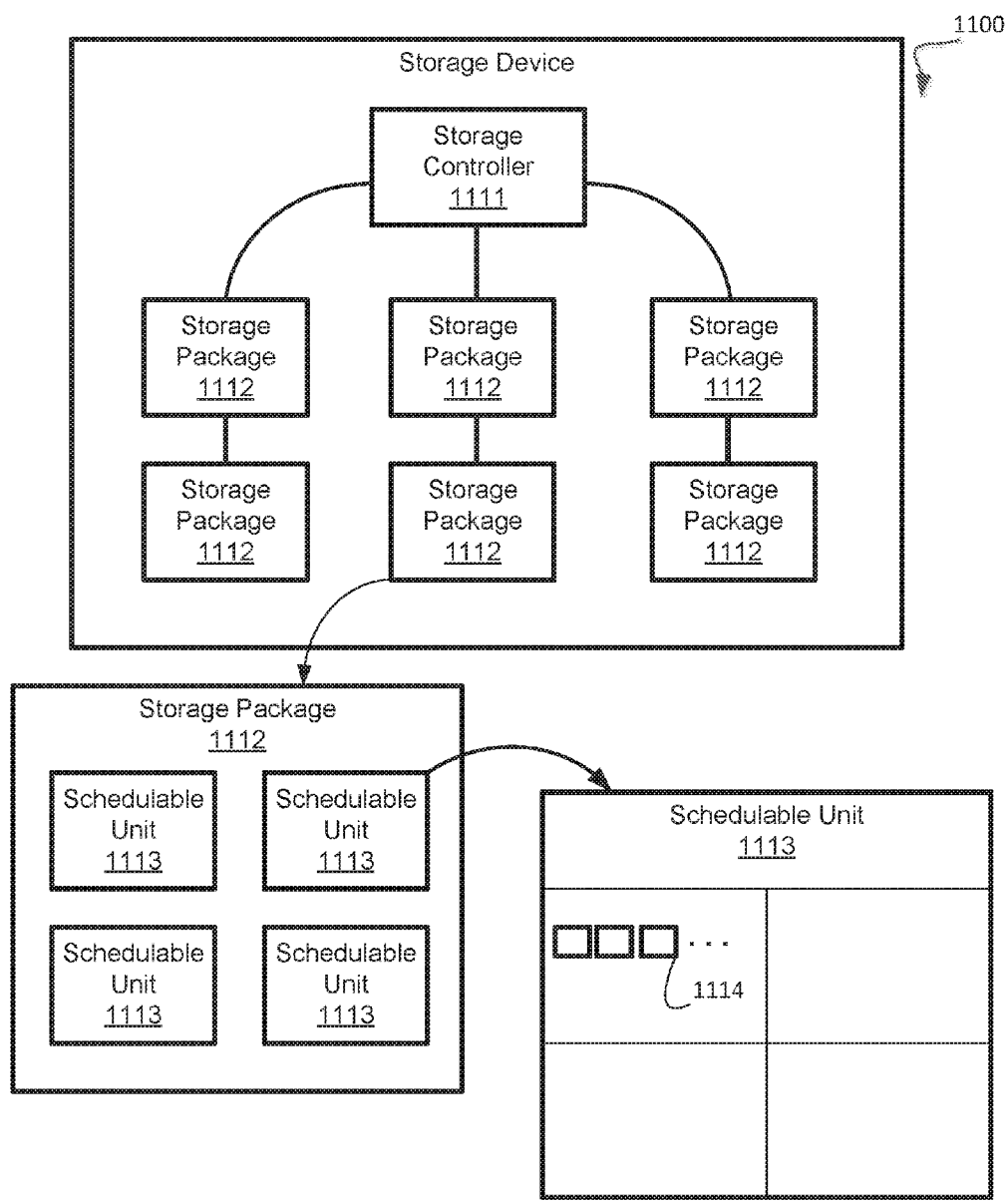
FIG. 11 illustrates an example architecture of schedulable units of a storage device in accordance with some embodiments.

FIG. 11 illustrates an example architecture 1100 of schedulable units of a storage device. In general, the architecture 1100 may correspond to a storage device that is associated with a data management component 140 or data management component 200 of FIG. 1 or 2.

As shown in FIG. 11, the architecture 1100 of the storage device may include a storage controller 1111 and multiple storage packages 1112. Each of the storage packages 1112 may include multiple schedulable units 1113 (i.e., storage dies). Furthermore, as shown, each of the schedulable units 1113 may include multiple data blocks 1114. As previously described, each of the schedulable units 113 may perform a read operation or a write operation in parallel with other schedulable units 113. Thus, an operation may be performed with or on one of the data blocks 1114 of each of the schedulable units 1113 at the same time.

Figure 12:
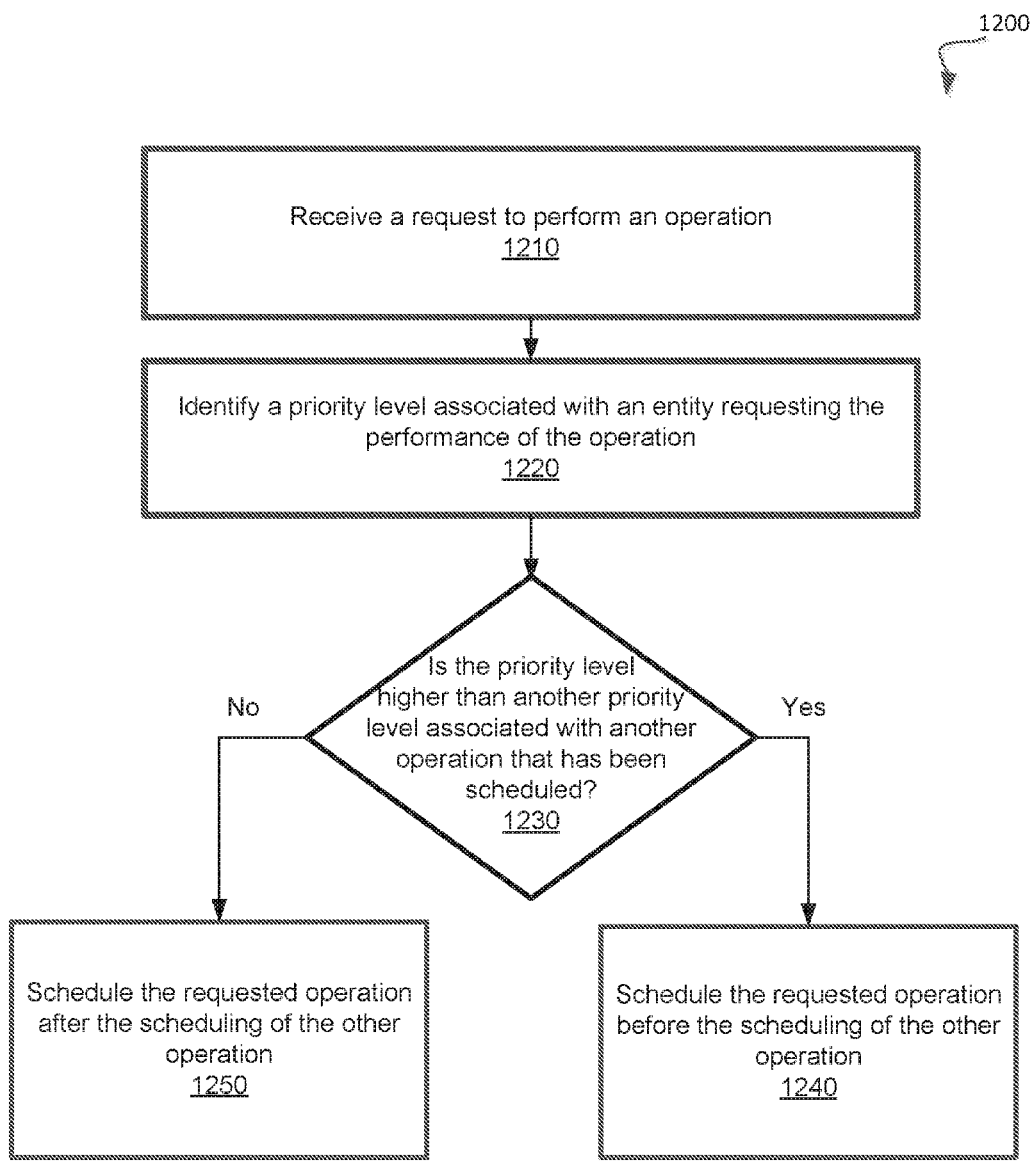
FIG. 12 is an example method to perform a requested operation based on other operations of schedulable units and characteristics of a client system or system task in accordance with some embodiments of the present disclosure.

FIG. 12 is an example method 1200 to perform a requested operation based on other operations of schedulable units and characteristics of a client system or a system task. In general, the method 1200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 1200.

As shown in FIG. 12, the method 1200 may begin with the processing logic receiving a request to perform an operation (block 1210). For example, an operating system or an application may receive a request to perform a write operation or a read operation at a storage device. The processing logic may further identify a priority level associated with an entity requesting the performance of the operation (block 1220). The entity may be a client system or a system task. For example, the system task may be a process or operation of an operating system or a host system. The client system may be associated with a user account that may specify a priority level for the client system. The priority level may specify an importance of the requested operation. The processing logic may further determine whether the priority level is higher than another priority associated with another operation that has been scheduled (block 1230). For example, a determination may be made as to whether the priority level assigned to an entity requesting the operation is higher or lower than another priority level assigned to another entity that has requested the other operation that has been scheduled. If the priority level is higher than the other priority level, then the processing logic may schedule the requested operation before the scheduling of the other operation (block 1240). For example, the requested operation may be performed at a schedulable unit before the other operation. Otherwise, if the priority level is lower than the other priority level, then the processing logic may schedule the requested operation after the scheduling of the other operation (block 1250). For example, the other operation may be performed at a schedulable unit before the requested operation.

In some embodiments, if the priority levels are the same, then the operation that is received earlier may be scheduled before a later received operation with the same priority level. In some embodiments, a requested write operation with a high priority level may be assigned to a schedulable unit that is available to perform the requested write operation sooner or earlier than another schedulable unit that is available later when compared to another write operation with a lower priority level.

Figure 13:
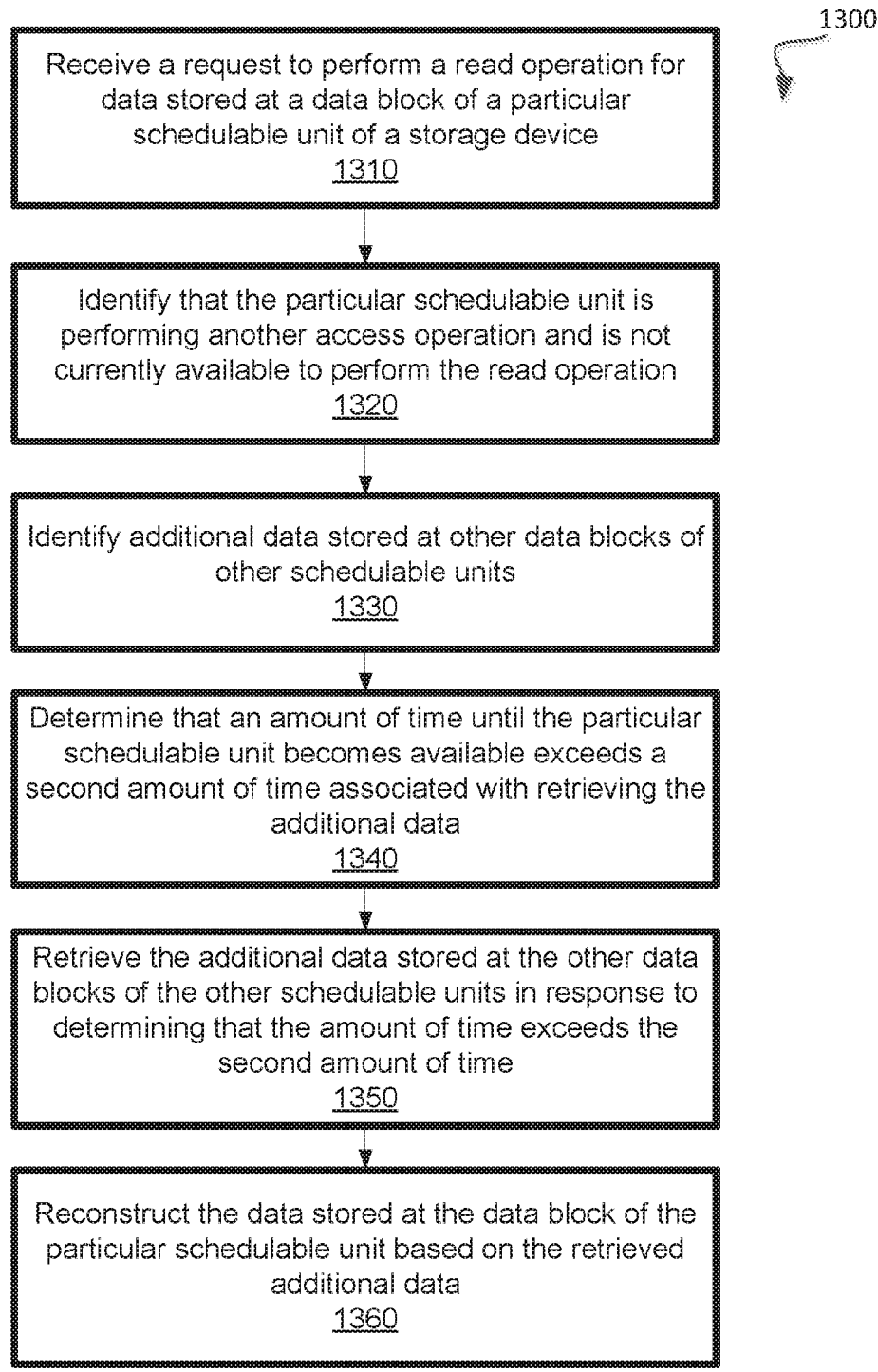
FIG. 13 is an example method to perform a read operation based on other operations of schedulable units in accordance with some embodiments.

FIG. 13 is an example method 1300 to perform a read operation based on other operations of schedulable units. In general, the method 1300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the data management component 140 or data management component 200 of FIG. 1 or 2 may perform the method 1300.

As shown in FIG. 13, the method 1300 may begin with the processing logic receiving a request to perform a read operation for data stored at a data block of a particular schedulable unit of a storage device (block 1310). For example, the operating system or the application may receive the request to perform the read operation for the data. The processing logic may subsequently identify that the particular schedulable unit is performing another access operation (and/or is scheduled to perform additional access operations) and is not currently available to perform the read operation (block 1320). For example, the schedulable unit that includes the data block that stores the requested data may be performing a read operation or a write operation for a data block that is included in the schedulable unit. The processing logic may identify additional data stored at other data blocks of other schedulable units (block 1330). For example, different portions of data may be stored at different data blocks of different schedulable units of one or more storage devices. In some embodiments, the different data may be stored at different schedulable units at different storage devices of a storage array. Thus, the different data may be stored at multiple storage devices. Subsequently, the processing logic may determine that an amount of time until the particular schedulable unit becomes available exceeds a second amount of time associated with retrieving the additional data (block 1340). For example, other access operations that have been scheduled at the particular schedulable unit may be identified. In some embodiments, other access operations that have been scheduled at the other schedulable units may be identified to determine the second amount of time that may correspond to an amount of time to retrieve the additional data. The processing logic may subsequently retrieve the additional data stored at the other data blocks of the other schedulable units in response to determining that the amount of time exceeds the second amount of time (block 1350). For example, the particular schedulable unit may not be available to perform a read operation due to other access operations that have been scheduled. Otherwise, if the amount of time until the particular schedulable unit becomes available does not exceed the second amount of time, then the additional data may not be retrieved from the other data blocks of the other schedulable units. Instead, the read operation for the data stored at the data block of the particular schedulable unit may be scheduled.

Referring to FIG. 13, the processing logic may subsequently reconstruct the data stored at the data block of the particular schedulable unit based on the retrieved additional data (block 1360). For example, the reconstructed data may be the data that is stored at the data block of the particular schedulable unit that is not currently available and may be generated based on a combination of the additional data stored at the other schedulable units.

Figure 14:
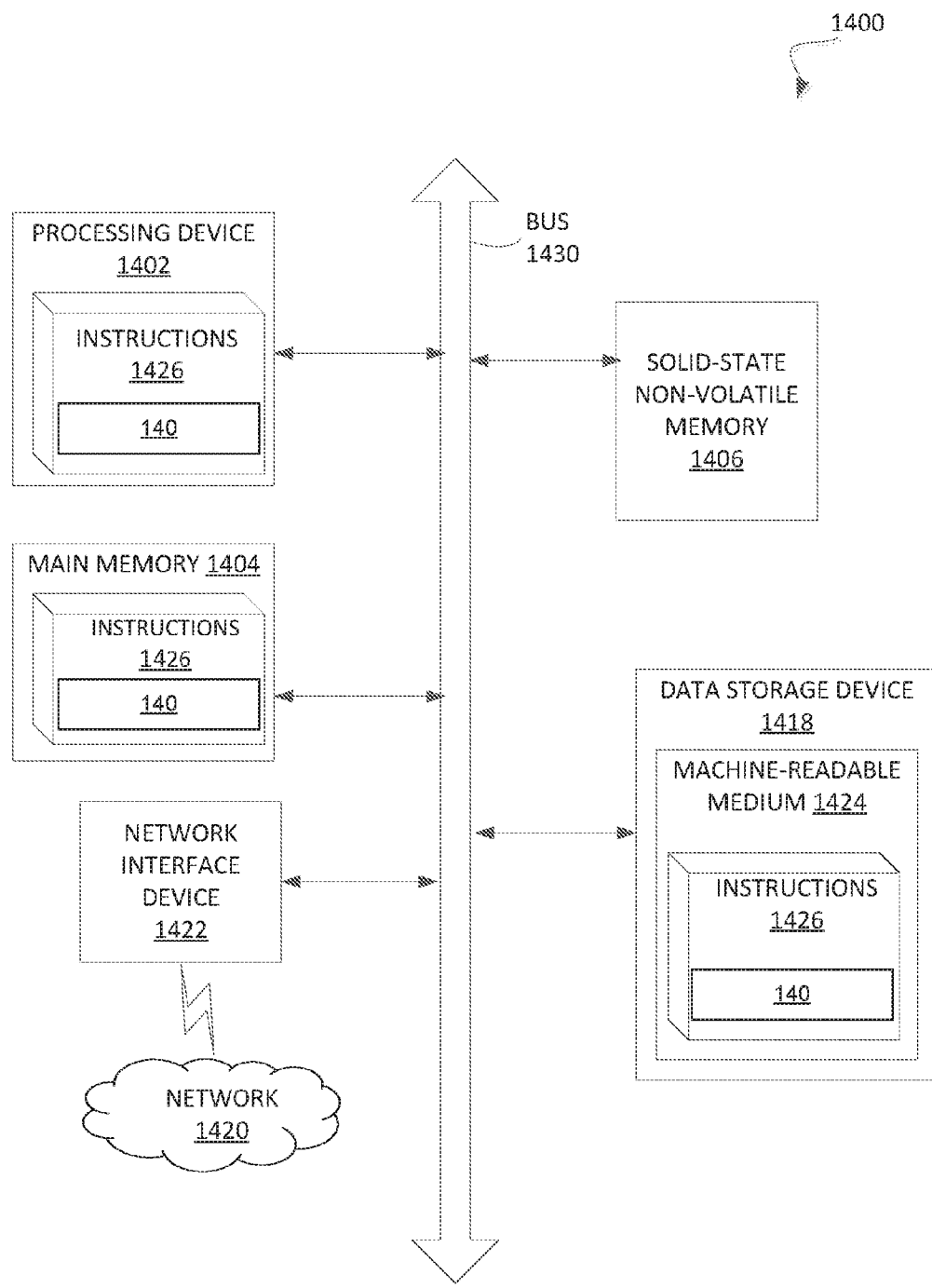
FIG. 14 is a block diagram of an example computer system operating in accordance with the disclosure described herein.

FIG. 14 depicts an example computer system 1400 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1400 includes a processing device 1402, a main memory 1404 (e.g., read-only memory (ROM), flash memory, dynamic random access memory (DRAM) such as synchronous DRAM (SDRAM)), a solid-state non-volatile memory 1406 (e.g., flash memory, 3D crosspoint (XPoint) memory, magnetoresistive random-access memory (MRAM), or any other such storage media that does not use a physical disk), and a data storage device 1416, which communicate with each other via a bus 1408.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also be one or more special-purpose processing devices such as an application specific integrated circuit (ASIC), a field programmable gate array (FPGA), a digital signal processor (DSP), network processor, or the like. The processing device 1402 is configured to execute the data management component 140 or 200 of FIG. 1 or 2 for performing the operations and steps discussed herein. The computer system 1400 may further include a network interface device 1422. The data storage device 1416 may include a computer-readable medium 1424 on which is stored the data management component 140 or 200 of FIG. 1 or 2 embodying any one or more of the methodologies or functions described herein. The data management component 140 or 200 of FIG. 1 or 2 may also reside, completely or at least partially, within the main memory 1404 and/or within the processing device 1402 during execution thereof by the computer system 1400, the main memory 1404 and the processing device 1402 also constituting computer-readable media. The data management component 140 or 200 of FIG. 1 or 2 may further be transmitted or received over a network via the network interface device 1422.

While the computer-readable storage medium 1424 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "performing," "using," "registering," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
identifying a solid-state storage device associated with a host server of a solid-state storage array;
retrieving, from the solid-state storage device and by an application that is executed by a processing device of the host server of the solid-state storage array, a file from the solid-state storage device, the file specifying an organization of information included in a plurality of tables that are associated with characteristics of a plurality of data blocks of the solid-state storage device, the organization of the information specifying a plurality of data fields in each row of the plurality tables by identifying a location and size of each of the plurality of fields in each row of the plurality of tables;
reading the file specifying the organization of the information included in the plurality of tables to identify a particular location of a particular data stored at one of the tables of the plurality of tables, the particular location being associated with one of the plurality of data fields in a particular row within the one of the tables and with a particular data block of the plurality of data blocks of the solid-state storage device; and
performing a read operation or a write operation from the application of the host server to the file at the solid-state storage device based on the particular location of the particular data stored at the one of the tables of the plurality of tables that are associated with the characteristics of the plurality of data blocks of the solid-state storage device.

2. The method of claim 1, wherein performing the read operation or the write operation is further based on the characteristics of the plurality of data blocks.

3. The method of claim 1, wherein the information included in the plurality of tables comprises a number of write operations that have been performed for each of the plurality of data blocks of the solid-state storage device.

4. The method of claim 1, wherein the organization of the information specifies, for each of the plurality of tables, the data fields for each row of each of the plurality of tables, each row corresponding to a different data block of the plurality of data blocks of the solid-state storage device.

5. The method of claim 4, wherein organization of the information specifies an offset and a size for each of the data fields, wherein the offset specifies a difference between a start of a respective data field and a start of a respective row that includes the respective data field, and wherein the size specifies a number of bits of the respective row that are included in the respective data field.

6. The method of claim 1, wherein the file is stored at a volatile memory of a storage controller of the solid-state storage device.

7. The method of claim 1, wherein the file from the solid-state storage device is modified in response to an update to a firmware of the solid-state storage device.

8. The method of claim 1, wherein the application is associated with an operating system.

9. The method of claim 1, wherein the application is associated with a user space.

10. A system comprising:
a solid-state storage array; and
a storage controller coupled to the solid-state storage array, the storage controller comprising a processing device, the processing device to:
identify a solid-state storage device associated with a host server of the solid-state storage array;
retrieve, from the solid-state storage device and by an application that is executed by the processing device, a file from the solid-state storage device, the file specifying an organization of information included in a plurality of tables that are associated with characteristics of a plurality of data blocks of the solid-state storage device, the organization of the information specifying a plurality of data fields in each row of the plurality tables by identifying a location and size of each of the plurality of fields in each row of the plurality of tables;
read the file specifying the organization of the information included in the plurality of tables to identify a particular location of a particular data stored at one of the tables of the plurality of tables, the particular location being associated with one of the plurality of data fields in a particular row within the one of the tables and with a particular data block of the plurality of data blocks of the solid-state storage device; and
perform a read operation or a write operation from the application of the host server to the file at the solid-state storage device based on the particular location of the particular data stored at the one of the tables of the plurality of tables that are associated with the characteristics of the plurality of data blocks of the solid-state storage device.

11. The system of claim 10, wherein performing the read operation or the write operation is further based on the characteristics of the plurality of data blocks of the solid-state storage device, and wherein the characteristics correspond to a number of write operations that have been performed for each of the plurality of data blocks of the solid-state storage device.

12. The system of claim 10, wherein the information included in the plurality of tables comprises a number of write operations that have been performed for each of the plurality of data blocks of the solid-state storage device.

13. The system of claim 12, wherein the organization of the information specifies, for each of the plurality of tables, the data fields for each row of each of the plurality of tables, each row corresponding to a different data block of the plurality of data blocks of the solid-state storage device.

14. The system of claim 13, wherein organization of the information specifies an offset and a size for each of the data fields, wherein the offset specifies a difference between a start of a respective data field and a start of a respective row that includes the respective data field, and wherein the size specifies a number of bits of the respective row that are included in the respective data field.

15. The system of claim 10, wherein the file is stored at a volatile memory of the storage controller of the solid-state storage device.

16. The system of claim 10, wherein the file from the solid-state storage device is modified in response to an update to a firmware of the solid-state storage device.

17. The system of claim 10, wherein the application is associated with an operating system.

18. The system of claim 10, wherein the application is associated with a user space.

19. A non-transitory computer readable storage medium storing instructions, which when executed, cause a processing device to:

identify a solid-state storage device associated with a host server of a solid-state storage array;

retrieve, from the solid-state storage device and by an application that is executed by the processing device, a file from the solid-state storage device, the file specifying an organization of information included in a plurality of tables that are associated with characteristics of a plurality of data blocks of the solid-state storage device, the organization of the information specifying a plurality of data fields in each row of the plurality tables by identifying a location and size of each of the plurality of fields in each row of the plurality of tables;

read the file specifying the organization of the information included in the plurality of tables to identify a particular location of a particular data stored at one of the tables of the plurality of tables, the particular location being associated with one of the plurality of data fields in a particular row within the one of the tables and with a particular data block of the plurality of data blocks of the solid-state storage device; and perform a read operation or a write operation from the application of the host server to the file at the solid-state storage device based on the particular location of the particular data stored at the one of the tables of the plurality of tables that are associated with the characteristics of the plurality of data blocks of the solid-state storage device.

20. The non-transitory computer readable storage medium of claim 19, wherein performing the read operation or the write operation is further based on the characteristics of the plurality of data blocks of the solid-state storage device, and wherein the characteristics correspond to a number of write operations that have been performed for each of the plurality of data blocks of the solid-state storage device.

21. The non-transitory computer readable storage medium of claim 19, wherein the information included in the plurality of tables comprises a number of write operations that have been performed for each of the plurality of data blocks of the solid-state storage device.

22. The non-transitory computer readable storage medium of claim 21, wherein the organization of the information specifies, for each of the plurality of tables, the data fields for each row of each of the plurality of tables, each row corresponding to a different data block of the plurality of data blocks of the solid-state storage device.

23. The non-transitory computer readable storage medium of claim 22, wherein organization of the information specifies an offset and a size for each of the data fields, wherein the offset specifies a difference between a start of a respective data field and a start of a respective row that includes the respective data field, and wherein the size specifies a number of bits of the respective row that are included in the respective data field.

24. The non-transitory computer readable storage medium of claim 19, wherein the file is stored at a volatile memory of a storage controller of the solid-state storage device.

25. The non-transitory computer readable storage medium of claim 19, wherein the file from the solid-state storage device is modified in response to an update to a firmware of the solid-state storage device.

26. The non-transitory computer readable storage medium of claim 19, wherein the application is associated with an operating system.

* * * * *